United States Patent
Haltmayer

(10) Patent No.: US 11,388,456 B2
(45) Date of Patent: *Jul. 12, 2022

(54) DYNAMIC ALLOCATION OF CPU CYCLES IN VIDEO STREAM PROCESSING

(71) Applicant: Harmonic, Inc., San Jose, CA (US)

(72) Inventor: Neven Haltmayer, Sunnyvale, CA (US)

(73) Assignee: Harmonic, Inc., San Jose, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/132,136

(22) Filed: Sep. 14, 2018

(65) Prior Publication Data
US 2019/0014357 A1 Jan. 10, 2019

Related U.S. Application Data

(63) Continuation of application No. 14/961,239, filed on Dec. 7, 2015, now Pat. No. 10,104,405.

(Continued)

(51) Int. Cl.
*H04N 21/2385* (2011.01)
*H04N 7/01* (2006.01)
(Continued)

(52) U.S. Cl.
CPC ........... *H04N 21/2385* (2013.01); *H04N 7/01* (2013.01); *H04N 7/0806* (2013.01); *H04N 19/127* (2014.11); *H04N 19/154* (2014.11); *H04N 19/172* (2014.11); *H04N 19/179* (2014.11); *H04N 21/23418* (2013.01); *H04N 21/241* (2013.01); *H04N 21/2405* (2013.01);
(Continued)

(58) Field of Classification Search
CPC ......... H04N 21/2385; H04N 21/23418; H04N 21/2405; H04N 21/241; H04N 21/6143; H04N 7/01; H04N 7/0806; H04N 19/127; H04N 19/154; H04N 19/172; H04N 19/179
USPC ................. 375/240.16; 718/1; 709/223, 219; 700/2; 348/14.09
See application file for complete search history.

(56) References Cited

U.S. PATENT DOCUMENTS 6,055,270 A 4/2000 Ozkan
9,736,271 B2 * 8/2017 Stevens ............... H04L 67/2814
(Continued)

*Primary Examiner* — John W Miller
*Assistant Examiner* — Sean N. Haiem
(74) *Attorney, Agent, or Firm* — Brokaw Patent Law PC; Christopher J. Brokaw

(57) ABSTRACT

Approaches for dynamically allocating CPU cycles for use in processing a video stream. Video complexity information for two or more digital video streams actively being processed by one or more video encoders is determined at periodic intervals. Video complexity information describes the complexity of digital video carried by the digital video streams across a bounded number of consecutive digital frames which includes digital frames not yet processed by the one or more video encoders. A determination is made as to whether a number of CPU cycles allocated for processing a particular digital video stream should be adjusted based on the determined video complexity information. The number of CPU cycles allocated for processing the particular digital video stream may be dynamically adjusted by maximizing a measure of optimal video quality calculated for the two or more digital video streams using, at least in part, the determined video complexity information.

24 Claims, 4 Drawing Sheets

Related U.S. Application Data

(60) Provisional application No. 62/089,096, filed on Dec. 8, 2014.

(51) Int. Cl.

| | | |
|---|---|---|
| *H04N 21/61* | (2011.01) | |
| *H04N 21/234* | (2011.01) | |
| *H04N 21/24* | (2011.01) | |
| *H04N 19/127* | (2014.01) | |
| *H04N 21/241* | (2011.01) | |
| *H04N 19/172* | (2014.01) | |
| *H04N 19/179* | (2014.01) | |
| *H04N 19/154* | (2014.01) | |
| *H04N 7/08* | (2006.01) | |
| *H04N 19/436* | (2014.01) | |
| *H04N 19/136* | (2014.01) | |

(52) U.S. Cl.
CPC ....... *H04N 21/6143* (2013.01); *H04N 19/136* (2014.11); *H04N 19/436* (2014.11)

(56) References Cited

U.S. PATENT DOCUMENTS

| | | | |
|---|---|---|---|
| 2003/0007516 A1 | 1/2003 | Abramov | |
| 2004/0039455 A1* | 2/2004 | Donovan | G06F 9/3851 700/2 |
| 2008/0040453 A1* | 2/2008 | Cohen | H04N 7/16 709/219 |
| 2010/0104017 A1* | 4/2010 | Faerber | H04N 7/52 375/240.16 |
| 2012/0051420 A1 | 3/2012 | Chen | |
| 2012/0236111 A1* | 9/2012 | Halavy | H04N 7/152 348/14.09 |
| 2014/0085480 A1* | 3/2014 | Saptharishi | G06F 16/71 348/159 |
| 2014/0112384 A1 | 4/2014 | Van Veldhulsen | |
| 2014/0181285 A1* | 6/2014 | Stevens | H04L 67/2814 709/223 |
| 2015/0254094 A1* | 9/2015 | Cao | G06F 16/24568 718/1 |

* cited by examiner

DYNAMIC ALLOCATION OF CPU CYCLES IN VIDEO STREAM PROCESSING

CLAIM OF PRIORITY

This application is a continuation of, and claims priority to, U.S. non-provisional patent application Ser. No. 14/961,239, filed Dec. 7, 2015, entitled "Dynamic Allocation of CPU Cycles in Video Stream Processing," the contents of which are hereby incorporated by reference for all purposes as if fully set forth herein.

U.S. non-provisional patent application Ser. No. 14/961,239 claims priority to U.S. provisional patent application Ser. No. 62/089,096, filed Dec. 8, 2014, entitled "Dynamic Allocation of CPU Cycles in Video Stream Processing," the contents of which are hereby incorporated by reference for all purposes as if fully set forth herein.

FIELD OF THE INVENTION

Embodiments of the invention relate to optimizing hardware resources used by software responsible for processing digital video.

BACKGROUND

A communication satellite's transponder is a series of interconnected units which form a communications channel between receiving and transmitting antennas. Most communication satellites carry dozens of transponders, each transponder having a bandwidth of tens of megahertz. Most transponders operate on a "bent pipe" principle by sending a received signal back to earth with minimal processing, e.g., a transponder might amplify a signal and shift the signal from an uplink frequency to a downlink frequency. Some communication satellites use a "regenerative" transponder whereby a received signal is also demodulated, decoded, re-encoded and modulated aboard the satellite.

Two or more digital video services (such as a channel) may be supported by a single transponder. As each transponder has a fixed capacity, the determination of how many digital video services that a particular transponder supports is based on maximizing the limited resources of the transponder as best possible. To arrive at the number of digital video services a particular transponder should support, one could simply assign an equal, fixed-sized share of the total capacity of the transponder to each service carried by the transponder. For example, if the transponder is to support five services, then each service would be assigned a fixed 20% of the capacity of the transponder. In this fashion, the transponder could support additional services until the proportional share of the transponder capacity assigned to a particular service is less than the minimum amount of transponder capacity required to support the worst case scenario or high water mark use-case of that service.

In practice, the amount of transponder capacity required by any particular single digital video service fluctuates over time. To make better use of the transponder in view of the changing needs of the services it supports, an approach termed "statistical multiplexing" has been used to allocate transponder resources to digital video services. In statistical multiplexing, the capacity of the transponder is dynamically adjusted many times a second based on the complexity of the digital video carried by each channel supported by the transponder. The complexity of the digital video is a measure of how much data it takes to describe how to display the digital video. In this way, when a particular channel requires a larger portion of the transponder's capacity, additional transponder resources can be allocated to that channel from another channel which is not using all of its allocated transponder resources at the moment.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
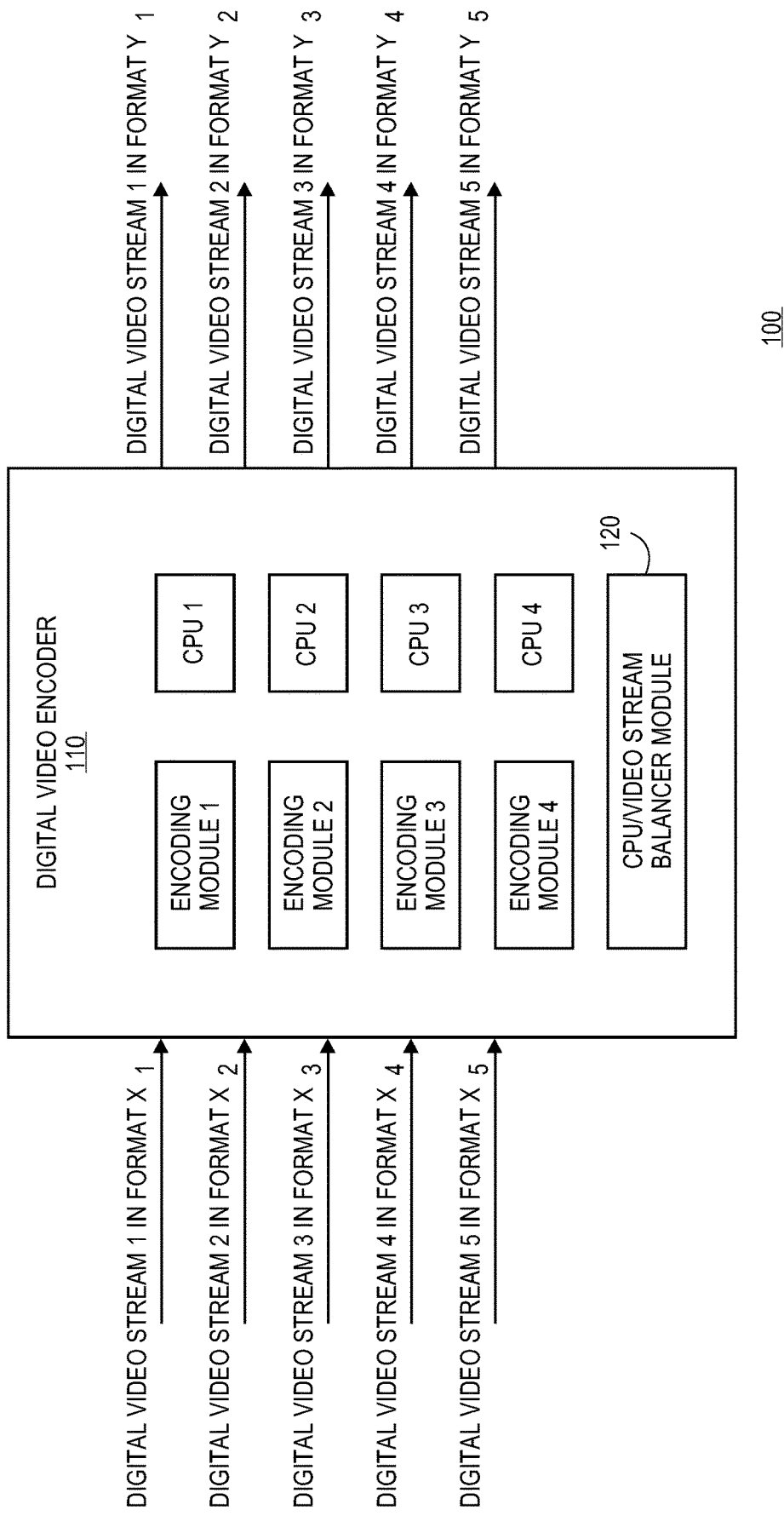
FIG. 1 is an block diagram of the functional components of one embodiment of the invention.

Approaches for dynamically allocating CPU cycles for use in processing a video stream are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

A digital video encoder is hardware component, configured with software, which converts digital video from one format to another. It may be advantageous or necessary to change the format in which a digital video file is expressed for a variety of reasons, such as to achieve, gain, or promote standardization, speed, secrecy, security, and/or compression. A digital video encoder may support encoding more than one digital video stream at a time. As a specific example of a digital video encoder, the Electra 8100 is a single rack-unit (1-RU) encoder with a multi-standard, multi-service and multi-channel capability available from Harmonic, Inc. of San Jose, Calif. The Electra 8100 supports encoding 4 channels simultaneously per chassis (1-RU).

A digital video encoder may comprise multiple central processing units (CPUs or cores). For example, the Electra 8100 encoder includes four CPUs. Software responsible for encoding functionality is typically written to execute on a single CPU. Therefore, four difference instances of the encoding software (individually referred to as an "encoding module") may execute on the Electra 8100, each of which is designed to execute upon a separate CPU. Accordingly, in the prior art, each encoding module is designed to execute instructions using a single CPU.

Embodiments of the invention enable the cycles of each CPU of a digital video encoder to be more efficiently utilized by encoding modules. In an embodiment of the invention, at periodic intervals, the video complexity of a portion of the unprocessed (i.e., not yet encoded) digital video carried in the video streams being processed by the digital video encoder may be determined. After determining the complexity of a portion of the digital video in each digital video stream being processed by the digital video encoder, the number of CPU cycles allocated to each encoding module may be dynamically adjusted. The adjustment may be made to ensure that each encoding module has been allocated the most optimal proportional share of CPU cycles given the complexity of the digital video each encoding module is responsible for encoding at any moment in time. In this way, if a particular digital video stream is particularly complex and requires additional CPU cycles to process, then the encoding module responsible for encoding that particular digital video stream may receive an additional allocation of CPU cycles which were previously allocated elsewhere.

In an embodiment, the additional CPU cycles allocated to the encoding module may only be temporary allocated while an encoding module is actively encoding the complex portion of digital video. In other embodiments, the additional CPU cycles allocated to the encoding module may be permanently allocated until a subsequent adjustment to the allocation is made. Advantageously, embodiments of the invention enable the CPU cycles of a digital video encoder to be dynamically allocated to optimize the quality of the encoded digital video produced by the digital video encoder.

Dynamic Adjustment of CPU Cycles to Video Encoding Processes

FIG. 1 is a block diagram 100 of the functional components of a digital video encoder 110 according to an embodiment of the invention. Digital video encoder 110 is a computer system which is designed to convert digital video streams from one format to another. For clarity, in FIG. 1, the format of incoming digital video streams (i.e., video steams not yet encoded by digital video encoder 110) are depicted in the format of $X_{stream\ number}$, while the format of outgoing digital video streams (i.e., video streams which have been encoded by digital video encoder 110) are depicted in the format of $Y_{stream\ number}$.

Digital video encoder 110, as depicted in FIG. 1, comprises four CPUs; however, digital video encoder 110 may comprise any number of CPUs. In an embodiment, digital video encoder 110 may be implemented using computer system 400, which is explained in further detail below with reference to FIG. 4.

Digital video encoder 110, as depicted in FIG. 1, comprises four encoding modules. An encoding module, as used herein, refers to software responsible for encoding a particular digital video stream from one format to another format. For example, encoding module 1 may be responsible for encoding digital video stream 1 from format $X_1$ to format $Y_1$. While FIG. 1 depicts four encoding modules, in embodiments of the invention, digital video encoder 110 may comprise any number of encoding modules; the number of encoding modules in digital video encoder 110 is independent of the number of CPUs in digital video encoder 110. An encoding module of an embodiment may be executed using CPU cycles from any CPU of digital video encoder 110.

Digital video encoder 110 also comprises CPU/video stream balancer module 120 (hereafter "balancer module" 120). Balancer module 120 is software responsible for adjusting the number of cycles of CPUs of digital video encoder 110 allocated to encoding modules also executing on digital video encoder 110. To do so, balancer module 120 examines the complexity of the digital video which will be processed in the near term by the digital video encoder 110. Recognizing that the complexity of the digital video being carried by each stream may vary, balancer module 120 renders a judgment as to the best allocation of the CPU cycles available from the CPUs of the digital video encoder 110 to each encoding module based on the complexity of the digital video each encoding module will soon be processing.

Figure 2:
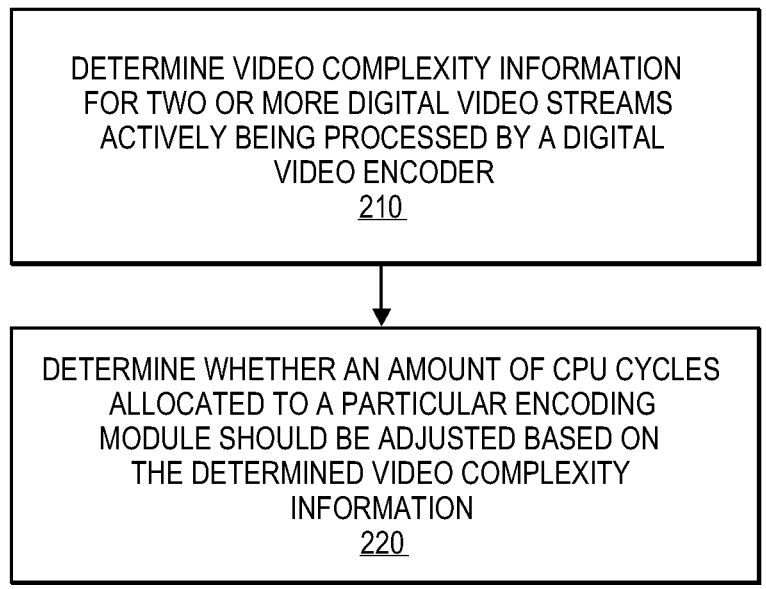
FIG. 2 is a flowchart illustrating the steps of dynamically allocating CPU cycles for use in processing a video stream according to an embodiment of the invention.

In an embodiment of the invention, balancer module 120 performs the steps depicted in FIG. 2. FIG. 2 is a flowchart illustrating the steps of dynamically allocating CPU cycles for use in processing a video stream according to an embodiment of the invention. In an embodiment, balancer module 120 may perform the steps of FIG. 2 at regular intervals. For example, balancer module 120 may dynamically adjust the CPU cycles allocated to encoding modules of digital video encoder after each frame of digital video is processed in a particular stream or each time after a certain number (such as two or more) of frames of digital video are encoded in a particular stream. Alternately, balancer module 120 may dynamically adjust the CPU cycles allocated to encoding modules of digital video encoder 110 each time after a frame of digital video has been encoded in each video stream or each time after a certain number (such as two or more) of frames of digital video in each video stream have been encoded. In another embodiment, balancer module 120 may dynamically adjust the CPU cycles allocated to one or more encoding modules of digital video encoder 110 repeatedly after a certain period of time (such as the expiration of a predetermined number of milliseconds) has transpired or repeatedly after a certain number of CPU clock cycles has occurred.

Figure 3:
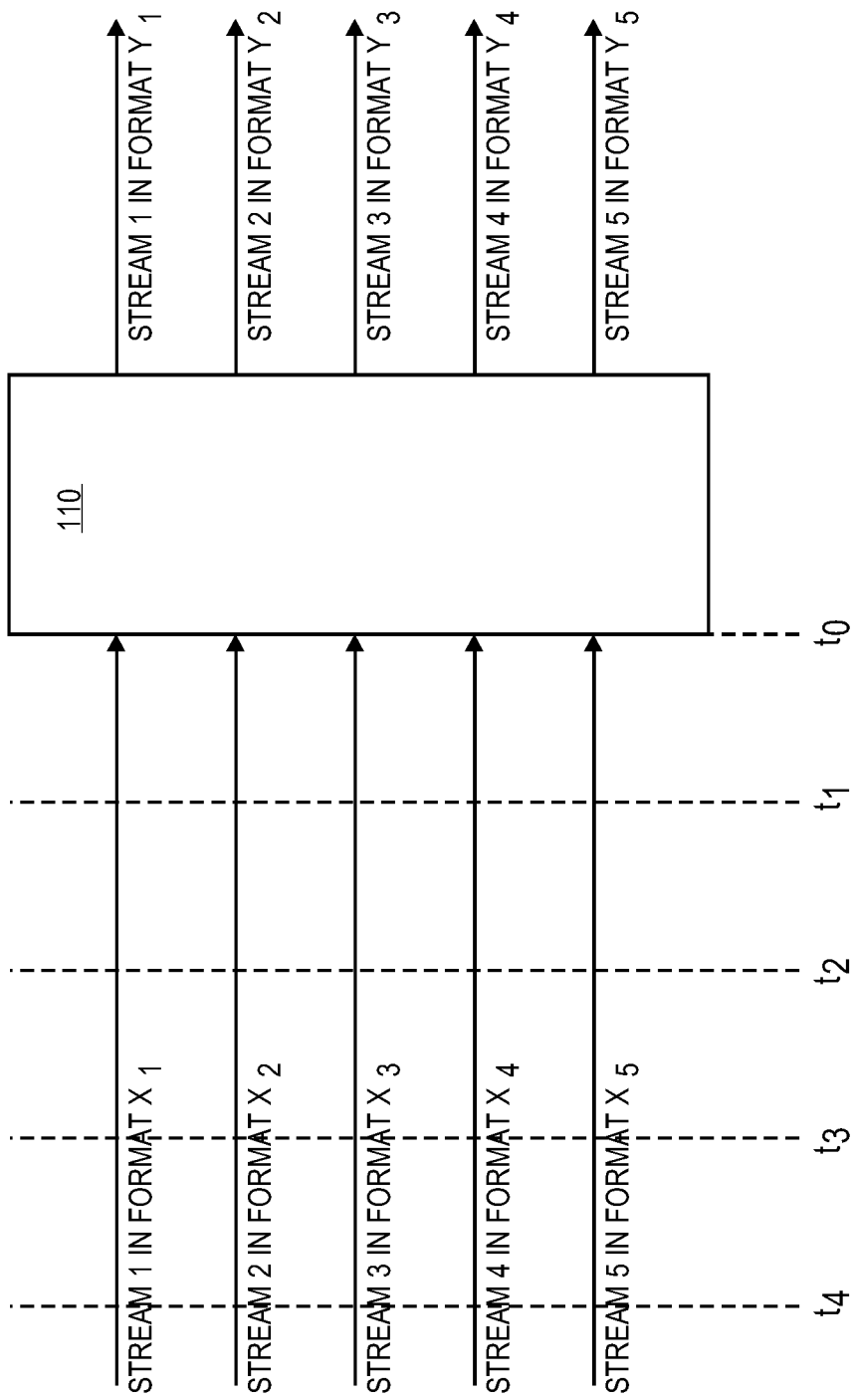
FIG. 3 is an illustration of digital video recorder encoding a plurality of digital video streams according to an embodiment of the invention.

Initially, in step 210 of FIG. 2, video complexity information for two or more digital video streams actively being processed by digital video encoder 110 is determined. To better appreciate the performance of step 210, it may be helpful to illustrate the performance of step 210 with respect to FIG. 3, which is an illustration of digital video recorder 110 encoding a plurality of digital video streams according to an embodiment of the invention.

The video complexity information determined in step 210 describes the complexity of digital video carried by each digital video stream being processed by digital video encoder 110 across a bounded interval. For example, since there are five digital video streams being encoded by digital video encoder 110 in FIG. 3, then the video complexity information determined in step 210 would describe the complexity of the digital video in each of the five streams in the example of FIG. 3.

The complexity of a digital video is a measure of how much data it takes to describe how to display the digital video. The amount of data required to represent a digital video increases with the complexity of the digital video. For example, digital video rendered at a higher quality requires more data bits to express than the same digital video rendered at a lower resolution. As another example, it takes more information to describe how to display moving objects on a screen than how to describe non-moving images; therefore, digital video depicting content in motion (such as World Cup football match) requires more data bits to express than content having fewer moving parts. Digital video may also support certain features which add to its complexity.

Embodiments of the invention may employ any known or subsequently developed techniques for assessing the complexity of digital video in the performance of step 210.

The video complexity information determined in step 210 is intended to describe the complexity of the digital video not yet processed by digital video encoder 110 measured over a predetermined period or interval. For example, in an embodiment, video complexity information determined in step 210 may cover from the interval bounded by time $t_0$ to time $t_1$, whereas the intervals bounded by $t_0$ and $t_1$ may be measured by frames of digital video, CPU cycles since being received by digital video encoder 110, or milliseconds since being received by digital video encoder 110. As another example, video complexity information determined in step 210 may cover from the interval bounded by time $t_0$ to time $t_4$, whereas the intervals bounded by time $t_0$, $t_1$, $t_2$, $t_3$, and $t_4$ may be measured by frames of digital video, CPU cycles since being received by digital video encoder 110, or milliseconds since being received by digital video encoder 110. Note that t0 represents the time when digital video encoder 110 begins processing the digital video stream; consequently, the frames of digital video in digital video streams in the intervals bounded by $t_0$, $t_1$, $t_2$, $t_3$, and $t_4$ have not yet processed by digital video encoder 110.

In step 220, balancer module 120 determines whether the current amount of CPU cycles allocated to a particular encoding module should be adjusted based on the video complexity information determined in step 210. The purpose of performing step 220 is to ensure that the CPU cycles provided by the CPUs within digital video encoder 110 are allocated to encoding modules to maximize the quality or desirability of digital video across the digital video streams being encoded by digital video encoder 110. Therefore, if balancer module 120 does determine in step 220 that the complexity of an upcoming portion of digital video which will be handled by a particular encoding module requires an additional CPU cycles to process to ensure the desired video quality, then balancer module 120 will dynamically adjust how many CPU cycles are allocated to that particular encoding module accordingly. Balancer module 120 may perform step 220 on any number of encoding modules, such as a single encoding module or two or more encoding modules.

In an embodiment, balancer module 120 may consult one or more policies which define criteria for determine how to optimize the allocation of CPU cycles to the processing of digital video streams. For example, certain digital video channels may be assigned a greater weight than other digital video channels. In doing so, balancer module 120 may assess certain digital video channels at a greater importance than other digital video channels. In this way, certain digital video channels may be designated premium channels that have a greater insurance of being encoded at the highest quality possible.

When allocating additional CPU cycles to an encoding module, it will be necessary to proportionally reduce the amount of CPU cycles previously allocated to another encoding module. For example, if balancer module 120 of FIG. 1 determines in step 220 to increases the allocation of CPU cycles to encoding module 1, then it will be necessary to reduce the CPU cycles previously allocated to one or more of encoding modules 2, 3, and 4 in the same aggregate amount. Ideally, it would be beneficial to decrease the allocation of CPU cycles in a way which minimizes the impact of doing so. For example, encoding module 2 may not require all the CPU cycles previously allocated thereto, and so it would be beneficial to reduce CPU cycles to encoding module 2 before decreasing the CPU cycles allocated to another encoding module which is using all of its previously allocated CPU cycles.

Therefore, in an embodiment, when dynamically increasing an amount of CPU cycles allocated to process the particular digital video stream, the impact of decreasing CPU cycles previously allocated to one or more encoding modules is considered. Note that any number of encoding modules may have their allocated share of CPU reduced so long as the total amount reduced equals or compensates for the increase of CPU cycles to other encoding modules.

For example, if encoding module 1 of FIG. 1 has its share of allocated CPU cycles increased by 4% in step 220, then encoding module 2 may have its share of allocated CPU cycles decreased by 4%, or encoding module 2 and encoding module 3 may each have their share of allocated CPU cycles decreased by 2%, or encoding module 2 and encoding module 3 may each have their share of allocated CPU cycles decreased by 1% while encoding module 4 may have its share of allocated CPU cycles decreased by 2%. The particular way in which encoding modules have their share of previously allocated CPU cycles decreased will be based on minimizing the impact upon the quality of encoded digital video produced by those encoding modules.

In adjusting the share of allocated CPU cycles from a first encoding module to a second encoding module, it may be necessary in certain embodiments to identify one or more features in the digital video stream being processed by the first encoding module in which support for will be reduced or ceased during the time when the allocated of CPU cycles is reduced.

Embodiments of the invention may employ a variety of different techniques for calculating how many CPU cycles will be needed to process a particular level of digital video complexity. For example, in certain embodiments, balancer module 120 may store and consult records comprising historical data of prior CPU cycle requirements for different levels of digital video complexity. Balancer module 120 may also employ certain algorithms to extrapolate CPU cycle requirements based on the stored historical data of prior CPU cycle requirements for different levels of digital video complexity.

FIG. 1 depicts a plurality of encoding modules executing on a single digital video encoder 110. Embodiments of the invention may be used to allocate CPU cycles to any number of encoding modules executing on a digital video encoder. Moreover, embodiments of the invention may be employing in an environment that uses two or more digital video encoders 110, such as a number of federated digital video encoders 110 or a plurality of digital video encoders 110 operating in a cloud environment or in communication with each other over a network, such as a private or public network. Thus, embodiments of the invention may be employed with any number of encoding modules, and the encoding modules used by embodiments may be, but need not, reside on a single physical machine. In other words, embodiments of the invention may be used to allocate CPU cycles to encoding modules regardless of their location in a distributed computing environment, as embodiments may allocate CPU cycles to encoding modules executing on different physical machines in a cloud or distributed computing environment.

Hardware Mechanisms

Figure 4:
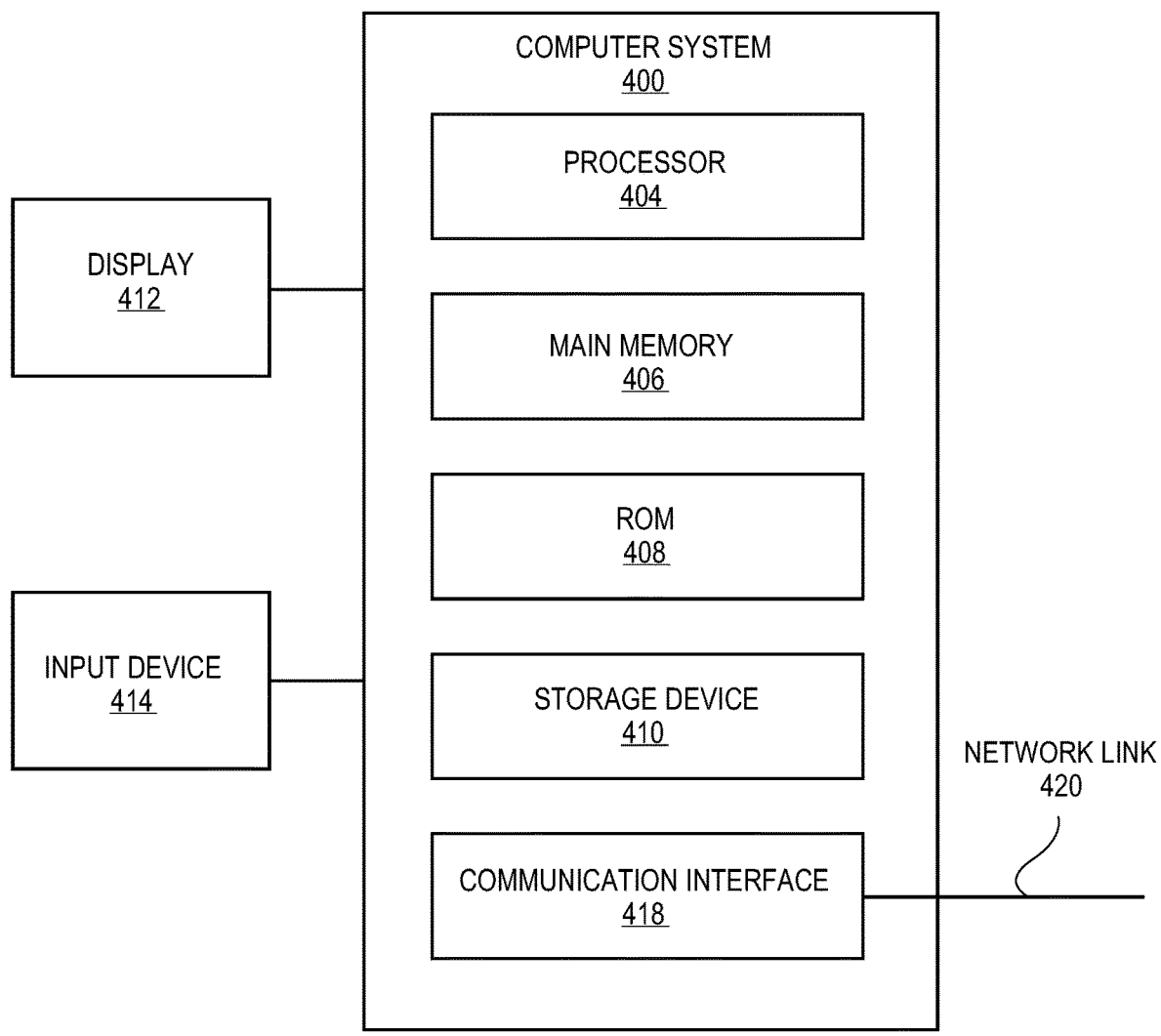
FIG. 4 is a block diagram that illustrates a computer system upon which an embodiment of the invention may be implemented.

In an embodiment, digital video encoder 110 of FIG. 1 may be implemented on a computer system. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for dynamically allocating CPU cycles for use in processing a video stream, which when executed by one or more processors, causes:

upon the occurrence of each periodic interval in a series of periodic intervals, performing:
(a) determining video complexity information for two or more digital video streams actively being processed by a single video encoder, wherein each of the two or more digital video streams actively being processed by the single video encoder are allocated an amount of CPU cycles of the single video encoder over each interval of said series of periodic intervals;
(b) determining whether the amount of CPU cycles of the single video encoder currently allocated for processing a particular digital video stream of the two or more digital video streams should be adjusted for a future interval of said series of periodic intervals based on (i) the determined video complexity information and (ii) an assessed impact of changing the amount of CPU cycles allocated to process at least one digital video stream of the two or more digital video streams; and
(c) upon determining that the amount of CPU cycles of the single video encoder currently allocated for processing a particular digital video stream of the two or more digital video streams should be adjusted for the future interval of said series of periodic intervals, adjusting the amount of CPU cycles of the single video encoder currently allocated for said future interval of said series of periodic intervals for processing at least the particular digital video stream of the two or more digital video streams.

2. The non-transitory computer-readable storage medium of claim 1, wherein each periodic interval in the series of periodic intervals corresponds to a frame of digital video in the particular video stream.

3. The non-transitory computer-readable storage medium of claim 1, wherein each periodic interval in the series of periodic intervals corresponds to a period of time or a certain number of CPU clock cycles.

4. The non-transitory computer-readable storage medium of claim 1, wherein the determined video complexity information describes the complexity of digital video carried by the two or more digital video streams across a bounded number of consecutive digital frames, wherein said bounded number of consecutive digital frames includes digital frames not yet processed by said single video encoder.

5. The non-transitory computer-readable storage medium of claim 1, wherein the execution of the one or more sequences of instructions further causes:
dynamically adjusting the amount of CPU cycles allocated for processing the particular digital video stream by maximizing a measure of optimal video quality calculated for the two or more digital video streams using, at least in part, the determined video complexity information.

6. The non-transitory computer-readable storage medium of claim 5, wherein
maximizing the measure of optimal video quality for the two or more digital video streams comprises:
identifying one or more features in at least one of the two or more digital video streams in which support for will be reduced or ceased during said periodic interval.

7. The non-transitory computer-readable storage medium of claim 5, wherein
the measure of optimal video quality for the two or more digital video streams is determined by assessing the video quality of at least one of the two or more digital video streams at a greater importance than another digital video stream in the two or more digital video streams.

8. The non-transitory computer-readable storage medium of claim 1, wherein the assessed impact of changing the amount of CPU cycles comprises:
assessing a first impact of decreasing the amount of CPU cycles allocated to process at least one digital video stream of the two or more digital video streams; and
assessing a second impact of increasing the amount of CPU cycles allocated to process the particular digital video stream proportional to a total amount of CPU cycles reduced from said at least one digital video stream.

9. An apparatus for dynamically allocating CPU cycles for use in processing a video stream, comprising:
one or more processors; and
one or more non-transitory computer-readable storage mediums storing one or more sequences of instructions, which when executed, cause:
upon the occurrence of each periodic interval in a series of periodic intervals, performing:

(a) determining video complexity information for two or more digital video streams actively being processed by a single video encoder wherein each of the two or more digital video streams actively being processed by the single video encoder are allocated an amount of CPU cycles of the single video encoder over each interval of said series of periodic intervals;

(b) determining whether an amount of CPU cycles of the single video encoder currently allocated for processing a particular digital video stream of the two or more digital video streams should be adjusted for a future interval of said series of periodic intervals based on (i) the determined video complexity information and (ii) an assessed impact of changing the amount of CPU cycles allocated to process at least one digital video stream of the two or more digital video streams, and (c) upon determining that the amount of CPU cycles of the single video encoder currently allocated for processing a particular digital video stream of the two or more digital video streams should be adjusted for the future interval of said series of periodic intervals, adjusting the amount of CPU cycles of the single video encoder currently allocated for said future interval of said series of periodic intervals for processing at least the particular digital video stream of the two or more digital video streams.

10. The apparatus of claim 9, wherein each periodic interval in the series of periodic intervals corresponds to a frame of digital video in the particular video stream.

11. The apparatus of claim 9, wherein each periodic interval in the series of periodic intervals corresponds to a period of time or a certain number of CPU clock cycles.

12. The apparatus of claim 9, wherein the determined video complexity information describes the complexity of digital video carried by the two or more digital video streams across a bounded number of consecutive digital frames, wherein said bounded number of consecutive digital frames includes digital frames not yet processed by said single video encoder.

13. The apparatus of claim 9, wherein the execution of the one or more sequences of instructions further causes:
dynamically adjusting the amount of CPU cycles allocated for processing the particular digital video stream by maximizing a measure of optimal video quality calculated for the two or more digital video streams using, at least in part, the determined video complexity information.

14. The apparatus of claim 13, wherein
maximizing the measure of optimal video quality for the two or more digital video streams comprises:
identifying one or more features in at least one of the two or more digital video streams in which support for will be reduced or ceased during said periodic interval.

15. The apparatus of claim 13, wherein
the measure of optimal video quality for the two or more digital video streams is determined by assessing the video quality of at least one of the two or more digital video streams at a greater importance than another digital video stream in the two or more digital video streams.

16. The apparatus of claim 9, wherein the assessed impact of changing the amount of CPU cycles comprises:

assessing a first impact of decreasing the amount of CPU cycles allocated to process at least one digital video stream of the two or more digital video streams; and assessing a second impact of increasing the amount of CPU cycles allocated to process the particular digital video stream proportional to a total amount of CPU cycles reduced from said at least one digital video stream.

17. A method for dynamically allocating CPU cycles for use in processing a video stream, comprising:
upon the occurrence of each periodic interval in a series of periodic intervals, performing:
(a) determining video complexity information for two or more digital video streams actively being processed by a single video encoder, wherein each of the two or more digital video streams actively being processed by the single video encoder are allocated an amount of CPU cycles of the single video encoder over each interval of said series of periodic intervals;
(b) determining whether the amount of CPU cycles of the single video encoder currently allocated for processing a particular digital video stream of the two or more digital video streams should be adjusted for a future interval of said series of periodic intervals based on (i) the determined video complexity information and (ii) an assessed impact of changing the amount of CPU cycles allocated to process at least one digital video stream of the two or more digital video streams; and
(c) upon determining that the amount of CPU cycles of the single video encoder currently allocated for processing a particular digital video stream of the two or more digital video streams should be adjusted for the future interval of said series of periodic intervals, adjusting the amount of CPU cycles of the single video encoder currently allocated for said future interval of said series of periodic intervals for processing at least the particular digital video stream of the two or more digital video streams.

18. The method of claim 17, wherein each periodic interval in the series of periodic intervals corresponds to a frame of digital video in the particular video stream.

19. The method of claim 17, wherein each periodic interval in the series of periodic intervals corresponds to a period of time or a certain number of CPU clock cycles.

20. The method of claim 17, wherein the determined video complexity information describes the complexity of digital video carried by the two or more digital video streams across a bounded number of consecutive digital frames, wherein said bounded number of consecutive digital frames includes digital frames not yet processed by said single video encoder.

21. The method of claim 17, further comprising:
dynamically adjusting the amount of CPU cycles allocated for processing the particular digital video stream by maximizing a measure of optimal video quality calculated for the two or more digital video streams using, at least in part, the determined video complexity information.

22. The method of claim 21, wherein maximizing the measure of optimal video quality for the two or more digital video streams comprises:
identifying one or more features in at least one of the two or more digital video streams in which support for will be reduced or ceased during said periodic interval.

23. The method of claim 21, wherein the measure of optimal video quality for the two or more digital video streams is determined by assessing the video quality of at least one of the two or more digital video streams at a greater importance than another digital video stream in the two or more digital video streams.

24. The method of claim 17, wherein the assessed impact of changing the amount of CPU cycles comprises:
assessing a first impact of decreasing the amount of CPU cycles allocated to process at least one digital video stream of the two or more digital video streams; and
assessing a second impact of increasing the amount of CPU cycles allocated to process the particular digital video stream proportional to a total amount of CPU cycles reduced from said at least one digital video stream.

* * * * *